United States Patent [19]

Isaka et al.

[11] 4,413,066

[45] Nov. 1, 1983

[54] CROSSLINKABLE POLYETHYLENE RESIN COMPOSITIONS

[75] Inventors: Tsutomu Isaka; Mitsugu Ishioka; Takeo Shimada; Takayuki Inoue, all of Yokkaichi, Japan

[73] Assignee: Mitsubishi Petrochemical Company, Ltd., Japan

[21] Appl. No.: 235,749

[22] Filed: Feb. 18, 1981

Related U.S. Application Data

[62] Division of Ser. No. 54,474, Jul. 3, 1979, abandoned.

[30] Foreign Application Priority Data

Jul. 5, 1978 [JP] Japan .................................. 53-80952
Jul. 5, 1978 [JP] Japan .................................. 53-80953

[51] Int. Cl.$^3$ ................................................ C08J 9/22
[52] U.S. Cl. ................................ 521/149; 525/326.5
[58] Field of Search ..................... 525/383; 526/279; 260/42.26; 521/149

[56] References Cited

U.S. PATENT DOCUMENTS

| | | | |
|---|---|---|---|
| 3,225,018 | 12/1965 | Zutly | 528/481 |
| 3,392,156 | 7/1968 | Donaldson | 528/481 |
| 3,644,306 | 2/1972 | Longi et al. | 525/370 |
| 3,646,155 | 2/1972 | Scott et al. | 525/288 |
| 4,153,765 | 5/1979 | Tsai | 526/279 |

FOREIGN PATENT DOCUMENTS

| | | |
|---|---|---|
| 50-138402 | 1/1975 | Japan . |
| 52-9073 | 1/1977 | Japan . |
| 55-155045 | 3/1980 | Japan .................................. 526/279 |
| 1346588 | 2/1974 | United Kingdom . |
| 1372453 | 10/1974 | United Kingdom . |
| 1406680 | 9/1975 | United Kingdom . |
| 1408154 | 10/1975 | United Kingdom . |
| 1415194 | 11/1975 | United Kingdom . |

OTHER PUBLICATIONS

Hacks Chemical Dictionary 4th Edit., p. 527.

*Primary Examiner*—Paul R. Michl
*Attorney, Agent, or Firm*—Robert E. Burns; Emmanuel J. Lobato; Bruce L. Adams

[57] ABSTRACT

A crosslinkable polyethylene resin composition comprises, basically, (A) a copolymer of ethylene and an ethylenically unsaturated silane compound, wherein the content of the ethylenically unsaturated silane compound unit is 0.001 to 15 percent by weight, and (B) a silanol condensation. The copolymer may further comprise a monomer copolymerizable with the ethylene and the ethylenically unsaturated silane compound. The composition may be expandable, further comprising a foaming agent and may further comprise a polyolefin and a filler and may be in the form of a film or sheet.

14 Claims, No Drawings

CROSSLINKABLE POLYETHYLENE RESIN COMPOSITIONS

This is a divisional of application Ser. No. 054,474, filed July 3, 1979 abandoned.

BACKGROUND OF THE INVENTION

1. Field of Art

This invention relates generally to crosslinkable polyethylene resin compositions. More particularly the invention relates to polyethylene resin compositions the resins of which are crosslinkable by exposure to water, each composition comprising a random copolymer of ethylene and an ethylenically unsaturated silane compound having a hydrolyzable silane group as a crosslinkable group and a crosslinking reaction catalyst.

The procedure of crosslinking low-density polyethylenes and other polyethylene resins thereby to improve their mechanical strength, heat resistance, and other properties, and various crosslinking techniques for this purpose are known.

2. Prior Art

One known crosslinking technique of this character comprises adding an organic peroxide as a crosslinking agent to a polyethylene and heating these materials to a high temperature to decompose the peroxide and thereby to initiate the crosslinking reaction. In this case, however, since crosslinking due to the decomposition of the peroxide is carried out prior to the step of forming the polyethylene, the quality of the formed product is frequently defective, and, in extreme cases, the forming cannot be carried out satisfactorily.

If the crosslinking is to be carried out after the forming step, a high-temperature effective peroxide which can withstand the forming temperature must be used. In order to decompose a peroxide of such a character, the formed article must be heated to a temperature higher than the forming temperature. As a result, variations due to softening of the formed article will occur in the crosslinking step, and the quality of the formed product will still become defective.

As an example of a polyethylene which is not accompanied by such problems encountered in chemical crosslinking, there is a silicone-grafted polyethylene (as disclosed, for example, in Japanese Patent Publication No. 1711/1973, Patent Laid Open No. 8389/1972, Patent Laid Open No. 138042/1975, and Patent Laid Open No. 9073/1977). When a silicone-grafted polyethylene is exposed to water, its silicone part is hydrolyzed, and the crosslinking reaction progresses. Since this hydrolysis occurs at a relatively low temperature, the large-scale equipment required for chemical crosslinking becomes unnecessary. For this reason applications to crosslinked molded products are being studied.

In this case, however, a plurality of process steps for producing the base polyethylene and for grafting the silicone onto the base polyethylene are necessary. Moreover, a polyethylene article produced and crosslinked in this manner, such as, for example, a sheet, is unsatisfactory with respect to its odor, mechanical strength, heat resistance, and heat welding property.

On one hand, a method of causing crosslinking of copolymers of ethylene and a vinyl alkoxysilane by heating or by mechanical working (as disclosed in the specifications of U.S. Pat. Nos. 3,225,018 and 3,392,156) is known. This method is advantageous relative to the above mentioned grafting method in that a crosslinkable polyethylene is obtained with a single process step, that is, with only the copolymerization step. In this case, however, since the crosslinking unavoidably must be carried out prior to the forming process, the same problems as in the case of the above mentioned chemical crosslinking are encountered. Moreover, the mechanical strength of a formed article produced by forming after the crosslinking reaction is not satisfactory.

SUMMARY OF THE INVENTION

It is an object of this invention to provide solutions to the above described problems encountered in the prior art. It is contemplated in this invention to achieve this object and other objects thereof by combining a random copolymer comprising a unit of ethylene and a unit of an ethylenically unsaturated silane compound which is crosslinkable by exposure to water and a catalyst for crosslinking by exposure to water.

According to this invention, briefly summarized, there are provided crosslinkable polyethylene resin compositions each comprising (A) a copolymer comprising a unit of ethylene and a unit of an ethylenically unsaturated silane compound, wherein the content of the unit of ethylenically unsaturated silane compound is 0.001 to 15 percent by weight, and (B) a silanol condensation catalyst.

According to this invention, crosslinkability upon exposure to water is imparted to a polyethylene resin having a silane group introduced into polyethylene molecules, not by grafting, but by random copolymerization. The term "copolymers" as used herein does not include graft copolymers. However, it does not exclude graft copolymers which may unavoidably be produced concurrently.

A crosslinked formed article obtained by forming a composition of this invention and exposing it to water thereby to cause crosslinking therein not only has excellent mechanical strength and heat resistance but, in the form of a crosslinked sheet article (a sheet article being one of the formed articles of a composition of this invention), has a high performance equivalent in practice to that of an ordinary low-density polyethylene sheet with respect to heat welding property, which has given rise to the greatest difficulty in crosslinked polyethylene sheets of the prior art, as well as even high performance relative to heat resistance.

While there is no grafting step in this invention, a polyethylene wherein an unsaturated silane compound is copolymerized must be made separately, instead. However, partly because the quantity of the unsaturated silane compound used is small, production of the silanated copolymers is possible by carrying out this copolymerization by substantially the same method, as in the homopolymerization of ethylene, and may be considered to be within the diversification of polyethylenes.

DETAILED DESCRIPTION OF THE INVENTION

1. Copolymer of ethylene and unsaturated silane compound (Silanated copolymer)

For brevity, the copolymer comprising units of ethylene and an unsaturated silane compound is referred to as "the silanated copolymer."

For the unsaturated silane compound, various compounds each having an ethylenically unsaturated bond which is copolymerizable with ethylene and a hydrolyzable silane group can be used.

A compound of this character can be represented by the following general formula.

$$RSiR'_nY_{3-n}$$

wherein R designates an ethylenically unsaturated hydrocarbyl or hydrocarbylether group; R' designates an aliphatic saturated hydrocarbyl group; Y designates a hydrolyzable organic group; and n is 0, 1 or 2. When a plurality of Ys exist, they need not be the same.

More specific examples of these unsaturated silane compounds are those wherein, for example, R is vinyl, allyl, isopropenyl, butenyl, cyclohexyl and γ-methacryloxypropyl; Y is methoxy, ethoxy, formyloxy, acetoxy, propionyloxy, alkylamino, and arylamino; and R' is methyl, ethyl, propyl, decyl, and phenyl.

A particularly desirable unsaturated silane compound is represented by the following formula.

$$CH_2=CHSi(OZ)_3,$$

wherein Z is a hydrocarbyl group having 1 to 8 carbon atoms, preferably 1 to 4 carbon atoms.

In the most desirable case, this compound is vinyl trimethoxysilane, vinyl triethoxysilane, or vinyl triacetoxysilane.

The copolymerization of the ethylene and the unsaturated silane compound is carried out under appropriate conditions which will bring about the copolymerization of these two monomers.

More specifically, these copolymerization conditions include, for example: a pressure of 500 to 4,000 kg/cm², preferably 1,000 to 4,000 kg/cm²; a temperature of 100° to 400° C., preferably 150° to 350° C.; the presence of a radical polymerization initiator and, if necessary, a chain transfer agent, and the use of an autoclave, tubular reactor and the like, preferably an autoclave reactor wherein the two monomers are caused to contact simultaneously or stepwisely.

In this invention, any of the radical polymerization initiators and chain transfer agents known to be suitable for polymerization or copolymerization of ethylene can be used. Examples of such polymerization initiators are organic peroxides such as lauroyl peroxide, dipropionyl peroxide, benzoyl peroxide, di-t-butyl peroxide, t-butyl hydroperoxide, and t-butyl peroxyisobutyrate; molecular oxygen; and azo compounds such as azobisisobutyronitrile and azoisobutylvaleronitrile. Examples of such chain transfer agents are paraffins such as methane, ethane, propane, butane, and pentane; α-olefins such as propylene, butene-1, and hexene-1; aldehydes such as form aldehyde, acetaldehyde, and n-butylaldehyde; ketones such as acetone, methyl ethyl ketone, and cyclohexanone; aromatic hydrocarbons, and chlorohydrocarbons.

The copolymer used in the composition of this invention has a content of a unit of the unsaturated silane compound of 0.001 to 15 percent, preferably 0.01 to 5 percent, particularly preferably 0.05 to 2 percent, all percentages being by weight. In general, the silanated copolymer which has a high content of a unit of an unsaturated silane compound, after crosslinking has taken place upon exposure to water, possesses excellent mechanical strength and heat resistance. However, if this content is excessively high, the tensile elongation and heat welding property will deteriorate. The content range of 0.001 to 15 percent by weight was determined on the basis of this point.

2. Silanol condensation catalyst

In general, chemicals which can be used as catalysts for promoting dehydration condensation between silanols of silicone are suitable for use in this invention. A silanol condensation catalyst of this character is, in general, any of the carboxylates of metals such as tin, zinc, iron, lead, and cobalt, organic bases, inorganic acids, and organic acids.

Specific examples of the silanol condensation catalyst are dibutyltin dilaurate, dibutyltin diacetate, dibutyltin dioctoate, stannous acetate, stannous caprylate, lead naphthenate, zinc caprylate, cobalt naphthenate; ethylamines, dibutylamine, hexylamines, pyridine; inorganic acids such as sulfuric acid, and hydrochloric acid; and organic acids such as toluenesulfonic acid, acetic acid, stearic acid, and maleic acid. Particularly desirable compounds are the carboxylates of tin.

The quantity in which the silanol condensation catalyst is used can be suitably determined with respect to the given catalyst for the given copolymer with reference to the examples of practice set forth hereinafter. Generally speaking, the quantity of the catalyst to be blended into the composition is of the order of 0.001 to 10 percent by weight, preferably 0.01 to 5 percent by weight, particularly preferably 0.03 to 3 percent by weight, relative to the quantity of the silanated copolymer in the composition.

3. Preparation of composition

The composition of this invention can be prepared by any of the methods and means which can be used for blending various additives into thermoplastic resins.

The process of preparing the composition of this invention, in general, is one which is ordinarily accompanied by melting or dissolving (particularly the former) of the silanated copolymer and/or the silanol catalyst. For example, the copolymer, the silanol condensation catalyst (as it is or in the form of a solution or dispersion), and, when necessary, adjuvants are kneaded in an extruder and then extruded into desired formed articles such as, for example, molded articles, bars, tubes, sheets, and other articles or materials such as pellets.

Furthermore, the quantity of the silanol condensation catalyst is small in comparison with that of the copolymer as mentioned herinbefore. Accordingly, a convenient procedure, which is frequently resorted to in the blending of ingredients in small quantities, is to prepare a master batch by blending the silanol condensation catalyst in a high concentration in a dispersion medium such as a polyethylene and to blend this master batch dispersion into the copolymer in a quantity such that catalyst concentration becomes a specific value.

Another possible process comprises forming the copolymer into a desired formed article and thereafter immersing the formed article in a solution or a dispersion containing the silanol catalyst thereby to impregnate the article with the catalyst. By this process, a composition of this invention in a formed state can be obtained.

As frequently seen in resin compositions, the composition of this invention can contain various adjuvant materials. Examples of such adjuvant materials are miscible thermoplastic resins, stabilizers, lubricants, fillers, coloring agents, and foaming agents.

4. Crosslinking

When a formed article of a composition of this invention is exposed to water, a crosslinking reaction occurs. (It should be understood, however, that crosslinking is not a requisite of this invention).

This exposure to water is suitably carried out by causing the formed article to be contacted by water (in liquid or vapor state) at a temperature of the order of room temperature to 200° C., ordinarily of the order of room temperature to 100° C. for a contact time of the order of 10 seconds to 1 week, ordinarily of the order of 1 minute to 1 day. This contacting with water can be carried out under increased pressure. In order to increase the wetness of the formed article, the water may contain a wetting agent, a surfactant, a water-soluble organic solvent, or the like. In addition to ordinary water, the water can be in other forms such as heated water vapor or moisture in the air.

In addition, by exposing to water the composition of this invention during its preparation and forming, the preparation and forming of the composition and the crosslinking reaction can be carried out simultaneously.

5. Modifications

A variety of modifications relating to the composition of this invention are possible.

In one such modification, in addition to the two ingredients, namely, the ethylene and the ethylenically unsaturated silane compound, a terpolymer of these two monomers and another monomer copolymerizable therewith is used as the aforementioned copolymer. This comonomer can be selected from various monomers which are copolymerizable with the two monomers, the ethylene and the ethylenically unsaturated silane compound, and, moreover, are compatible with the unsaturated silane and/or the crosslinking reaction thereof. Examples of such comonomers are vinylesters such as vinylacetate, vinylbutyrate, vinylpivalate and the like; (meth)acrylates such as methyl(meth)acrylate, butyl(meth)acrylate, and the like; olefinically unsaturated carboxylic acids such as (meth)acrylic acid, maleic acid, fumaric acid and the like; derivatives of (meth)acrylic acid such as (meth)acrylamide, (meth)acrylonitrile and the like; and vinylethers such as vinylmethylether, vinylphenylether and the like. Particularly desirable comonomers are vinylesters and (meth)acrylic esters. The content of this comonomer unit within the copolymer is generally up to 40 percent by weight, preferably 0.5 to 35 percent by weight, more preferably 1 to 25 percent by weight of the copolymer.

Another modification comprises introducing a foaming agent into the composition of this invention thereby to render the composition foamable or expandable. The copolymer within the composition in this case, in addition to being a copolymer comprising substantially the ethylene unit and the ethylenically unsaturated silane unit, may be a copolymer comprising these two monomer units and, further, a third comonomer as described above. (In the modifications set forth herinafter, it is to be understood that the copolymer in the composition can be either of these two kinds of copolymers.)

Foaming agents which can be used for this purpose are those which are known to be suitable for the foaming of ethylenic resins.

Typical examples of such foaming agents are chemical foaming agents such as azodicarbonamide, dinitrosopentamethylenetetramine, p,p′-oxybis(benzenesulfonylhydrazide), N,N′-dimethyl-N,N′-dinitrosoterephthalamide and the like, and physical foaming agents such as hydrocarbons (for example, butane, pentane) and halogenated hydrocarbons (for example, methylchloride). Among the chemical foaming agents, azodicarbonamide is preferable in view of its stability and decomposition temperature. The above enumerated foaming agents can be used singly or as mixtures of a plurality thereof. A foaming agent (C) is used in a quantity which is, ordinarily, 0.2 to 30 percent by weight, preferably 0.5 to 20 percent by weight on the basis of the sum (A+C) where (A) represents the copolymer.

Still another modification comprises blending with this composition a polyolefin compatible therewith. Examples of this polyolefin are low-density, medium-density and high-density polyethylene, polypropylene, chlorinated polyethylene, and various copolymers comprising ethylene and one or more of other monomers (for example, vinyl acetate, methyl acrylate, propylene, butene, hexene and the like). The above mentioned polyolefin can be used singly or as mixtures of a plurality thereof. The content of the polyolefin in the composition is up to 70 percent by weight based on the sum of the quantities of this polyolefin and this copolymer. Furthermore, the content of the ethylenically unsaturated silane compound unit is based on this sum of the quantities of this polyolefin and this copolymer.

In a further modification, a fine inorganic filler is blended with this composition. Examples of this inorganic filler are silicates such as kaolin, pyrophanite, talc, montmorillonite, zeolite, mica, diatomaceous earth, silica, white carbon, calcium silicate, asbestos, glass powder, glass fiber, calcium carbonate, gypsum, magnesium carbonate, magnesium hydroxide, carbon black, titanium oxide and the like. The content of this inorganic filler is up to 60 percent by weight on the basis of the sum of quantities of this filler and this copolymer.

One specific, concrete example of the composition according to this invention is in the form of a film. The thickness of this film is ordinarily of the order of 5–500 microns. This film may be in the form of a laminate with one or more other films.

In order to indicate more fully the nature and utility of this invention, the following specific examples of practice constituting preferred embodiments of this invention and comparison examples are set forth, it being understood that these examples are presented as illustrative only and that they are not intended to limit the scope of the invention. Throughout these examples, all quantities specified in percent or parts are by weight.

EXAMPLES 1, 2, AND 3

Ethylene-vinyltrimethoxysilane copolymers were continuously synthesized, in each case, by supplying a mixture of ethylene, vinyltrimethoxysilane, and propylene as a chain transfer agent into a stirred autoclave reactor of 1.5-liter capacity and adding thereinto t-butylperoxyisobutylate as a polymerization initiator under the conditions of a pressure of 2,400 kg/cm$^2$ and a temperature of 220° C. The formed products thus obtained were almost odorless. The polymerization conditions and the properties of the formed copolymers are shown in Table 1.

To each of these copolymers, 5 percent of a master batch comprising 1 percent of dibutyltin dilaurate and 99 percent low-density polyethylene ("YUKALON EH-30" manufactured by Mitsubishi Petrochemical Co. Ltd., Japan) was added, and these materials were mixed for 7 minutes in a roll mill at a temperature of 120° to 125° C. and formed into a pressed sheet, which was immersed in hot water at 100° C. for one day to cause crosslinking. The tensile strength and elongation and heat welding property of the sheet thus obtained were measured whereupon the results shown in Tables 2 and 3 were obtained.

COMPARISON EXAMPLE 1

2 percent of vinyltrimethoxysilane and 0.1 percent of dicumylperoxide were dispersed in a low-density polyethylene ("YUKALON EH-30" manufactured by the Mitsubishi Petrochemical Co. Ltd., Japan) having a melt index of 2 g/10 min and a density of 0.919 g/cc. The resulting dispersion was caused to undergo graft polymerization by the use of a 50-mm diameter Dulmage-screw extruder of an L/D of 24 at an extruding temperature of 200° C. The silicone-grafted polyethylene thus obtained had a very strong odor, but this was used further to form a pressed sheet which was caused to undergo crosslinking by the process set forth in Examples 1,2, and 3.

COMPARISON EXAMPLE 2

The ethylene-vinyltrimethoxysilane copolymer described in Example 3 in the specification of U.S. Patent 3,392,156 was subjected to a thermal and mechanical process in a roll mill at a temperature of 145° to 150° C. for 3 hours thereby to cause it to undergo crosslinking. The crosslinked material thus obtained was formed into a pressed sheet.

COMPARISON EXAMPLE 3

A low-density polyethylene ("YUKALON ZF-30" manufactured by the Mitsubishi Petrochemical Co. Ltd., Japan) having a melt index of 1 g/10 min and a density of 0.920 g/cc was formed into a pressed sheet.

The properties of the crosslinked sheets obtained in Comparison Examples 1, 2, and 3 are shown in Tables 2 and 3.

TABLE 1

| | Polymerization conditions and properties of copolymers formed | | | | | | Properties of copolymer | |
|---|---|---|---|---|---|---|---|---|
| | Polymerization conditions | | | | | | | |
| | Pressure Kg/cm$^2$ | Temperature °C. | Ethylene feed rate Kg/Hr | Vinylmethoxysilane feed rate g/Hr | Propylene feed rate lit./Hr | Initiator feed rate g/Hr | Ethylene conversion % | Melt*$^1$ index g/10 min | Vinyl*$^2$ silane content % by weight |
| Example 1 | 2400 | 220 | 43 | 13 | 600 | 1.6 | 15 | 1.0 | 0.05 |
| Example 2 | 2400 | 220 | 43 | 95 | 450 | 2.0 | 15 | 1.0 | 0.34 |
| Example 3 | 2400 | 220 | 43 | 190 | 400 | 2.4 | 15 | 1.0 | 0.72 |

*$^1$Test method: Japanese Industrial Standards JIS K 6760
*$^2$Analysis by fluorescent X-rays

TABLE 2

| | | | Tensile properties | | | |
|---|---|---|---|---|---|---|
| | Vinyl*$^1$ silane content % by weight | Gel*$^2$ content % by weight | Tensile strength and elongation*$^3$ at break point | | | |
| | | | 23° C. | | 80° C. | |
| | | | Strength Kg/cm$^2$ | Elongation % | Strength Kg/cm$^2$ | Elongation % |
| Example 1 | 0.05 | 32 | 190 | 550 | 55 | 510 |
| Example 2 | 0.34 | 71 | 200 | 450 | 75 | 430 |
| Example 3 | 0.72 | 79 | 185 | 350 | 75 | 340 |
| Comparison Example 1 | 0.72 | 70 | 165 | 370 | 60 | 370 |
| Comparison Example 2 | 0.72 | 68 | 105 | 190 | 40 | 230 |
| Comparison Example 3 | 0 | 0 | 170 | 600 | 15 | 390 |

*$^1$Analysis by fluorescent X-rays
*$^2$Extraction with boiling xylene for 10 hours
*$^3$Measured by JIS K6760

TABLE 3

| | Heat welding property*$^4$ | | | Gel content % by weight |
|---|---|---|---|---|
| | Peeling strength (kg/10 mm) | | | |
| | 160° C. | 180° C. | 200° C. | |
| Example 1 | 5.0 | 5.4 | 5.3 | 32 |
| Example 2 | 3.8 | 4.3 | 4.7 | 71 |
| Example 3 | 3.2 | 4.0 | 4.2 | 79 |
| Comparison Example 1 | 1.0 | 1.8 | 2.0 | 70 |
| Comparison Example 2 | 3.1 | 3.8 | 4.0 | 68 |
| Comparison Example 3 | 5.3 | 5.2 | 5.4 | 0 |

*$^4$Test method:

From a sheet of 0.5-mm thickness, several test pieces, each of 10-mm width and 100-mm length, were made. A number of test specimens, each comprising two test pieces superposed to each other and welded together under pressure, were prepared by preheating pairs of the test pieces respectively at 160° C., 180° C., and 200° C. in a steam pressing machine for one minute and thereafter pressing each pair for two minutes at a pressure of 6 kg/cm$^2$. The 90-degree peeling strength of the welded part of each test specimen thus prepared was measured by means of an autograph at a tensile speed of 500 mm/minute.

EXAMPLES 4 THROUGH 8

Ethylene-vinyltrimethoxysilane copolymers (A) were continuously synthesized, in each case, by supplying a mixture of ethylene, vinyltrimethoxysilane, and propylene into a stirred autoclave reactor of 1.5-liter capacity and adding thereinto t-butylperoxyisobutylate as a polymerization initiator under the conditions of a pressure of 2,400 kg/cm$^2$ and a temperature of 200° C. The polymerization conditions and the properties of the formed copolymers are shown in Table 4.

To 100 parts of each of the copolymers thus obtained, 5 parts of a master batch containing 1 percent of dibutyltin dilaurate (B) and a specific quantity of an azodicarbonamide-based foaming agent ("VINYFOR DG #5" manufactured by the Eiwa Kasei Company, Japan) (C) were added, and these materials were mixed for 5 minutes in a roll mill at a temperature of 120° to 125° C. The color of the resulting composition was thereafter uniform, from which it was determined that the distribution of the foaming agent within the mixture was uniform. Crosslinking reaction was not evident during this mixing. That is, the gel content was zero percent in all cases.

The mixture was next made into a sheet and taken out of the mill. This mixture in sheet state was heated for 10 minutes in a Geer oven at a temperature of 190° C. and thereby caused to expand.

The results of foaming and heat adhesive property of the product thus obtained are set forth in Tables 5 and 6.

EXAMPLE 9

An expandable composition comprising an ethylenevinyltrimethoxysilane copolymer (A), dibutyltin dilaurate (B), and a foaming agent (C) was prepared by the procedure of Example 7 and was placed in a mold of a depth of 10 mm and measuring 150 mm square. This mold was placed between press plates for 10 minutes under a pressure of 100 kg/cm$^2$ and at a temperature of 190° C. The pressure was removed after this pressing step thereby to cause the composition to expand.

The result of foaming thus obtained is indicated in Table 5.

COMPARISON EXAMPLES 4 AND 5

To two lots of a low-density polyethylene ("YUKALON EH-30" manufactured by the Mitsubishi Petrochemical Co. Ltd., Japan) of a melt index of 2 g/10 min and a density of 0.919 g/cc, two lots of vinyl trimethoxysilane were respectively added each in a quantity of 2 percent relative to the quantity of the corresponding lot of the polyethylene. The two lots of the vinyl trimethoxysilane respectively contained 0.06 and 0.1 percent of dicumyl peroxide dispersed therein. Each of the two mixtures thus obtained was subjected to graft polymerization by means of a 50-mm diameter extruder of an L/D ratio of 24 at an extrusion temperature of 200° C.

The two kinds of vinylsilane-grafted polyethylene thus obtained (hereinafter referred to as graft A and graft B) respectively had a melt index of 1.6 g/10 min and a silane content of 0.5 percent (graft A) and a melt index of 1.3 g/10 min and a silane content of 0.7 percent (graft B).

Then, by the procedure set forth in Examples 4 through 8, a mixture of vinylsilane-grafted polyethylene, dibutyltin dilaurate, and a foaming agent was obtained for each of the grafts A and B, and, by heating each expandable composition for 10 minutes in a Geer oven at a temperature of 190° C., it was caused to expand. Here, the above mentioned expandable compositions underwent partial progress in their crosslinking reactions at the time of mixing in the roll mill and were found to contain, respectively, 17 and 32 percent of gel.

The foaming results and the heat adhesive properties of the products thus obtained are shown in Tables 5 and 6.

TABLE 4

| | Polymerization conditions | | | | | | Properties of copolymer | |
|---|---|---|---|---|---|---|---|---|
| | Pressure Kg/cm$^2$ | Temperature °C. | Ethylene feed rate Kg/Hr | Vinylsilane feed rate g/Hr | Propylene feed rate lit./Hr | Initiator feed rate g/Hr | Conversion % | Melt*[1] index g/10 min | Vinylsilane*[2] content % by weight |
| Copolymer A | 2400 | 220 | 43 | 13 | 600 | 1.6 | 15 | 1.0 | 0.05 |
| Copolymer B | 2400 | 220 | 43 | 25 | 550 | 1.7 | 15 | 1.0 | 0.10 |
| Copolymer C | 2400 | 220 | 43 | 130 | 400 | 2.2 | 15 | 1.0 | 0.50 |

*[1]Test method: JIS K6760
*[2]Analysis by fluorescent X-rays

TABLE 5

Foaming results
Blend proportions: a and b based on a + b, c based on a.

| | | | Example | | | | | | Comparison Example | |
|---|---|---|---|---|---|---|---|---|---|---|
| | | | 4 | 5 | 6 | 7 | 8 | 9 | 4 | 5 |
| Composition | a | Copolymer A | 91% | — | — | — | — | — | — | — |
| | | Copolymer B | — | 99.8% | 91% | 70% | — | — | — | — |
| | | Copolymer C | — | — | — | — | 91% | 91% | — | — |
| | | Graft A | — | — | — | — | — | — | 91% | — |
| | | Graft B | — | — | — | — | — | — | — | 91% |
| | b | Foaming agent | 9% | 0.2% | 9% | 30% | 9% | 9% | 9% | 9% |
| | c | Catalyst master batch | 5% | 5% | 5% | 5% | 5% | 5% | 5% | 5% |
| Foaming | | Expandability | ◯** | ⊚* | ⊚* | ◯** | ⊚* | ⊚* | △*** | ✕**** |

TABLE 5-continued

| | | Foaming results Blend proportions: a and b based on a + b, c based on a. | | | | | | | |
|---|---|---|---|---|---|---|---|---|---|
| | | Example | | | | | | Comparison Example | |
| | | 4 | 5 | 6 | 7 | 8 | 9 | 4 | 5 |
| result | Cell structure | uniform | uniform | uniform | uniform | uniform | uniform | not uniform | — |
| | Apparent density | 0.065 g/cc | 0.75 | 0.060 | 0.021 | 0.061 | 0.060 | 0.076 | measurement impossible |
| | Gel content | 23% | 46 | 48 | 47 | 78 | 75 | 51 | 73 |

Note: all quantitative percentages by weight.
*Very good
**Good
***Not good (voids present)
****Very bad (cannot be called expanded structure)

TABLE 6

Heat adhesive property of foamed structure*

| | Gel content | Heat adhesion rate (%) | | |
|---|---|---|---|---|
| | % by weight | 160° C. | 180° C. | 200° C. |
| Example 4 | 23 | 100 | 100 | 100 |
| Example 6 | 48 | 90 | 100 | 100 |
| Example 8 | 78 | 60 | 95 | 100 |
| Comparison Example 4 | 51 | 5 | 20 | 95 |

*Four steel plates, each measuring 50 mm square and 2-mm thickness, were placed for 5 minutes in each of three Geer ovens respectively adjusted to temperatures of 160° C., 180° C., and 200° C. as shown in Table 6. The four plates from each oven were immediately thereafter placed respectively on surfaces of samples of the four foamed structures of Examples 4, 6, and 8 and Comparison Example 4 and were thus pressed against the samples for 30 seconds, after which the resulting laminated combinations of steel plate and foamed structure were left to cool naturally. The temperature to which each steel plate was heated was taken as the heat adhesion temperature, and the adhered state at the respective heat adhesion temperature was examined with respect to each foamed structure. In Table 6, the heat adhesion rate is an index indicating the state of adhesion between the steel plate and the foamed structure and is the percentage, with respect to the adhesion surface area at the time of adhesion, of the surface area of the foamed structure remaining in adhering state on the steel plate when after adhesion, the foamed structure is peeled away from the steel plate.

EXAMPLES 10 THROUGH 12

Ethylene-vinyltrimethoxysilane-vinyl acetate copolymers were continuously synthesized, in each case, by supplying a mixture of ethylene, vinyltrimethoxysilane, vinyl acetate and propylene as a chain transfer agent into a stirred autoclave reactor of 1.5-liter capacity and adding thereto t-butylperoxyisobutyrate as a polymerization initiator under the conditions of a pressure of 2,400 kg/cm² and a temperature of 209°-222° C. The polymerization conditions and the properties of the formed copolymers are shown in Table 7.

Each of the copolymers thus produced was formed into a sheet by means of a steam press. Each sheet thus produced was immersed in a solution of dibutyltin dilaurate in xylene in 10% by weight concentration and was then immersed in water of 70° C. for a day thereby to effect crosslinking of the copolymer. The properties of the sheets are shown in Table 8.

On the other hand, to each of the copolymers, 5 percent of a master batch comprising 1 percent by weight of dibutyltin dilaurate and 99 percent of low-density polyethylene was added, and each of the mixtures was kneaded at 120° C. for 5 minutes and was then formed into a pressed sheet of 0.5 mm-thickness. Each of the sheets was immersed in water of 70° C. for a day thereby to effect crosslinking of the copolymer.

From each of these sheets of the crosslinked copolymers was prepared a test piece of 10 mm-width and 100 mm-length, the two test pieces were superposed and the end portion of the assembled pieces was welded along the width thereof by means of a steam press at a pressure of 6 kg/cm² for 2 minutes after being preheated at 120° C., 140° C. or 180° C. for 1 minute. The 90° peeling strength of each of the welded test pieces was determined by means of an autograph at a peeling rate of 500 mm/min. at a room temperature. The results obtained are shown in Table 9.

EXAMPLE 13

The procedure of Examples 10 through 12 was followed except that vinyl acetate was replaced by methyl acrylate thereby to produce ethylene-methyl acrylatevinyltrimethoxysilane copolymer, which was subjected to sheeting and then to crosslinking. The properties of the sheet were determined, and the results obtained are shown in Tables 7 through 9.

TABLE 7

| | Polymerization conditions and properties of copolymers formed | | | | | | | | | | |
|---|---|---|---|---|---|---|---|---|---|---|---|
| | Polymerization conditions | | | | | | | | | Properties of copolymer | |
| Example | Pressure Kg/cm² | Temperature °C. | Ethylene feed rate Kg/Hr | VA or MA*⁴ feed rate Kg/Hr | Vinylsilane feed rate g/Hr | Propylene feed rate lit./Hr | Initiator feed rate g/Hr | Conversion % | Melt*¹ index g/10 min. | VA or MA*² content % by wt | Vinylsilane*³ content % by wt |
| 10 | 2400 | 220 | 32 | VA5.6 | 52 | 150 | 0.8 | 12 | 3.0 | 14 | 0.15 |
| 11 | 2400 | 218 | 32 | VA8.0 | 54 | 40 | 0.7 | 12 | 3.2 | 18 | 0.15 |
| 12 | 2400 | 215 | 32 | VA8.0 | 125 | 80 | 0.8 | 12 | 3.1 | 18 | 0.50 |
| 13 | 2400 | 220 | 32 | MA0.6 | 43 | 440 | 1.1 | 12 | 3.4 | 13 | 0.15 |

*¹Test method: Japanese Industrial Standards JIS K 6760
*²Analysis by infrared absorption spectrum
*³Analysis by fluorescent X-rays
*⁴VA: vinyl acetate
MA: methyl acrylate

TABLE 8

| | Property | | | | |
|---|---|---|---|---|---|
| Example | Tensile*1 strength kg/cm2 | Tensile*1 elongation % | Flexural*2 rigidity kg/cm2 | Heat*3 distortion % | Gel*4 content % by wt |
| 10 | 235 | 610 | 680 | 58 | 56 |
| 11 | 240 | 650 | 510 | 61 | 56 |
| 12 | 240 | 530 | 490 | 26 | 78 |
| 13 | 235 | 620 | 720 | 60 | 58 |

TABLE 9

| | Heat welding property | | | |
|---|---|---|---|---|
| | Peeling strength (kg/10 mm) at: | | | |
| Example | 120° C. | 140° C. | 160° C. | 180° C. |
| 10 | 6.2 | 6.5 | 6.7 | 6.8 |
| 11 | 6.3 | 6.6 | 6.5 | 6.7 |
| 12 | 5.8 | 6.1 | 6.4 | 6.3 |
| 13 | 6.1 | 6.4 | 6.7 | 6.5 |

Note:
*1Test method: JIS K 6760
*2Test method: ASTM D 747
*3Heat distortion was determined as follows: In an oil bath at 120° C., a load of 3 kg was applied on a flat test piece of 2 mm-thickness and 10 cm square, and the distortion after an hour was determined.
*4Gel content was determined by the method of extraction with boiling xylene for 10 hours.

EXAMPLES 14 THROUGH 17

To each of the copolymers shown in Examples 10 through 13 was added 5% by weight of a master batch comprising 1% by weight of dibutyltin dilaurate and 99% by weight of low-density polyethylene, and each of the mixtures thus obtained was formed into inflation film of 50 micron-thickness by inflation method where the extruder was of 40 mm diameter of L/D being 24, extrusion temperature was 150° C., and a blow ratio was 1.5. Each of the film thus obtained was placed in a room maintained constantly at a temperature of 40° C. and a relative humidity of 80% for a week thereby to effect crosslinking of the copolymer.

Each of the film was subjected to welding wherein two sheets of film were heat sealed by means of a hot plate heat sealing machine at a sealing temperature of 120° C., 140° C., 160° C. or 180° C. at a pressure of 2 $kg/cm^2$ for one second, and from the heat-sealed film was prepared each of test pieces of 2 cm-width and 10 cm-length, the heat sealed portion lying along the width, which was then subjected to 90° peeling strength determination by means of an autograph at a peeling rate of 500 mm/min. The results obtained are shown in Table 10.

TABLE 10

| | Heat seal property | | | | |
|---|---|---|---|---|---|
| | Peeling strength (g/20 mm) at: | | | | Gel content % by |
| Example | 120° C. | 140° C. | 160° C. | 180° C. | weight |
| 14 | 1300 | 1400 | 1450 | 1450 | 56 |
| 15 | 1350 | 1400 | 1450 | 1400 | 56 |
| 16 | 1250 | 1300 | 1400 | 1400 | 78 |
| 17 | 1350 | 1400 | 1450 | 1450 | 58 |

EXAMPLES 18 THROUGH 20

To each of the copolymers obtained by a process shown in Examples 1 through 3 was added 5% by weight of a master batch comprising 1% by weight of dibutyltin dilaurate and 99% by weight of low-density polyethylene. Each of the mixtures thus obtained was formed into inflation film of 60 micron-thickness by inflation method where the extruder was a full flight screw extruder of 40 mm diameter of L/D being 24, extrusion temperature was 170° C., and a blow ratio was 1.5. Each of the film thus obtained was placed in a room maintained constantly at a temperature of 40° C. and at a relative humidity of 80% for a week thereby to effect crosslinking of the copolymer. The results obtained are shown in Tables 11 and 12.

TABLE 11

| | Heat seal property*1 | | | | |
|---|---|---|---|---|---|
| | Heat seal strength (g/20 mm) at: | | | Vinylsilane content | Gel content |
| Example | 160° C. | 180° C. | 200° C. | % by wt. | % by wt. |
| 18 | 1450 | 1550 | 1650 | 0.05 | 29 |
| 19 | 1400 | 1500 | 1550 | 0.34 | 63 |
| 20 | 1350 | 1450 | 1500 | 0.7 | 72 |

Note:
*1Heat seal property was determined as follows: Strips of 20 mm-width and 100 mm-length were prepared from film to be tested of 60 micron-thickness. Two of the strips were superposed and the superposed assembly was subjected to heat sealing by means of a heat-bar heat sealing machine at a heat-bar temperature of 160, 180 or 200° C. at a pressure of 1 $kg/cm^2$ for a second along the width. The test piece thus produced was subjected to 90° peeling strength determination by means of an autograph at peeling rate of 50 mm/min.

TABLE 12

| | Tensile strength and elongation at break point* | | | |
|---|---|---|---|---|
| | 23° C. | | 80° C. | |
| Example | Stress kg/cm2 | Elongation % | Stress kg/cm2 | Elongation % |
| 18 | 210 | 650 | 60 | 520 |
| 19 | 225 | 600 | 85 | 480 |
| 20 | 225 | 450 | 95 | 400 |

Note:
*Test method: JISK6760

EXAMPLE 21

Ethylene-vinyltrimethoxysilane copolymer was continuously synthesized by supplying a mixture of 43 kg/Hr of ethylene, 190 g/Hr of vinyltrimethoxysilane and 400 lit./Hr of propylene as a chain transfer agent, into a stirred autoclave of 1.5-liter capacity and adding thereto 2.4 g/Hr of t-butylperoxyisobutyrate as a polymerization initiator under the conditions of a pressure of 2,400 $kg/cm^2$ and a temperature of 220° C. The product obtained had a melt index of 1 g/10 min. and a vinylsilane content of 0.75% by weight, and was almost odorless.

To the copolymer was added 5% by weight of the copolymer of a master batch comprising 1% by weight of dibutyltin dilaurate and 99% by weight of low-density polyethylene and was further added low-density polyethylene ethylene ("YUKALON ZF-30" manufactured by Mitsubishi Petrochemical Co. Ltd., Japan) having a melt index of 1 g/10 min. and density of 0.920 $g/cm^3$ in a quantity of 5% by weight of the total of the copolymer and the low-density polyethylene. The mixture thus obtained was formed into inflation film of 60 micron-thickness by inflation method where the extruder was a full flight screw extruder of 40 mm diameter of L/D being 24, extrusion temperature was 170° C. and a blow ratio was 1.5. The film thus obtained was placed in a room maintained constantly at a temperature of 40° C. and a relative humidity of 80% for a week thereby to effect crosslinking of the copolymer.

On the other hand, the same mixture of the copolymer, dibutyltin dilaurate and the low-density polyethylene as was formed into inflation film in the above procedure was milled over a roll mill at 120° to 125° C. for 7 minutes and formed into a pressed sheet, which was then immersed in water at 100° C. for a day thereby to effect crosslinking of the copolymer.

EXAMPLE 22

To the mixture of the copolymer and dibutyltin dilaurate obtained by the procedure of Example 21 was further added low-density polyethylene which was the same as was used in Example 21 in a quantity of 10% by weight of the total of the copolymer and the low density polyethylene.

The mixture was processed into inflation film and a pressed sheet, which were subjected to crosslinking of the copolymer, as was in Example 21.

EXAMPLE 23

To the mixture of the copolymer and dibutyltin dilaurate obtained by the procedure of Example 21 was further added low-density polyethylene which was the same as was used in Example 21 in a quantity of 30% by weight of the total of the copolymer and the low-density polyethylene.

The mixture was processed into inflation film and a pressed sheet, which were subjected to crosslinking of the copolymer, as was in Example 21.

EXAMPLE 24

To the mixture of the copolymer and dibutyltin dilaurate obtained by the procedure of Example 21 was further added low-density polyethylene which was the same as was used in Example 21 in a quantity of 50% by weight of the total of the copolymer and the low-density polyethylene.

The mixture was processed into inflation film and a pressed sheet, which were subjected to crosslinking, as was in Example 21.

EXAMPLE 25

To the mixture of the copolymer and dibutyltin dilaurate obtained by the procedure of Example 21 was further added low-density polyethylene which was the same as was used in Example 21 in a quantity of 70% by weight of the total of the copolymer and the low-density polyethylene.

The mixture was processed into inflation film and a pressed sheet, which were subjected to crosslinking, as was in Example 21.

The welding property, heat resistance and tensile property of the crosslinked products obtained in Examples 21 through 25 are shown in Table 13.

TABLE 13

| Example | Gel[1] content % by wt. | Heat seal[2] strength at: 160° C. | 180° C. | 200° C. | Heat[3] distortion % | Tensile strength[4] and elongation at break point Strength kg/cm² | Elongation % |
|---|---|---|---|---|---|---|---|
| | | g/2 cm | | | | | |
| 21 | 70 | 1,350 | 1,500 | 1,500 | 26 | 225 | 480 |
| 22 | 68 | 1,400 | 1,500 | 1,550 | 30 | 225 | 550 |
| 23 | 59 | 1,450 | 1,500 | 1,600 | 41 | 225 | 610 |
| 24 | 48 | 1,500 | 1,600 | 1,600 | 49 | 220 | 630 |

TABLE 13-continued

| Example | Gel[1] content % by wt. | Heat seal[2] strength at: 160° C. | 180° C. | 200° C. | Heat[3] distortion % | Tensile strength[4] and elongation at break point Strength kg/cm² | Elongation % |
|---|---|---|---|---|---|---|---|
| | | g/2 cm | | | | | |
| 25 | 25 | 1,550 | 1,600 | 1,600 | 62 | 215 | 640 |

Note:
[1] See note [4] for Table 9.
[2] Heat seal property was determined as follows: Superposed two sheets of film of 60 micron-thickness was subjected to heat sealing by means of a heat-plate heat sealing machine at a sealing temperature of 160° C., 180° C. or 200° C. at a pressure of 2 kg/cm² for 1 second, and from the heat-sealed film was prepared a test piece of 2 cm-width and 10 cm-length, the heat sealed portion lying along the width, which was then subjected to 90° peeling strength determination by means of a Schopper machine at a peeling rate of 500 mm/min.
[3] See note [3] for Table 9.
[4] Elongation was determined in accordance with Japanese Industrial Standards, JIS Z 1702.

EXAMPLES 26 THROUGH 31

Two types of ethylene-vinyltrimethoxysilane copolymers were continuously synthesized, in each case, by supplying a mixture of ethylene, vinyltrimethoxysilane and propylene as a chain transfer agent into a stirred autoclave reactor of 1.5-liter capacity and adding thereto t-butylperoxyisobutyrate as a polymerization initiator under the conditions of a pressure of 2,400 kg/cm² and a temperature of 220° C. The polymerization conditions and the properties of the produced copolymers are shown in Table 14.

Each of the copolymers in the form of pellets were immersed in a solution of dibutyltin dilaurate in xylene in 10% by weight concentration for one minute and was then immersed in water at 100° C. for one day thereby to effect crosslinking of the copolymer. Each of the crosslinked copolymers was subjected to extraction with boiling xylene for 10 hours to give a gel content of 54 and 75% by weight, respectively.

On the other hand, to the copolymer as was obtained hereinabove was added a quantity of a master batch comprising 1% by weight of dibutyltin dilaurate and low-density polyethylene ("YUKALON EH-30" manufactured by Mitsubishi Petrochemical Co. Ltd., Japan) and a quantity of kaolin clay of an average particle size of 1.9 microns. The mixture was extruded into strands by means of a double axes extruder of 40 mm diameter of L/D being 30 at a set temperature of 170° C. The gel content and the appearance of the strands as extruded were determined.

Pressed sheets were prepared from the strands thus obtained, which were immersed in water at 100° C. for one day thereby to effect crosslinking of the copolymers. Each of the sheets was subjected to determination of heat distortion.

The results obtained are shown in Table 15.

EXAMPLES 32 AND 33

Production of strands, determination of the gel content and the appearance of the strands as extruded were carried out in the same way as were in Examples 26 through 31 except that calcium carbonate of an average particle size of 0.04 micron was used in place of kaolin clay.

Each of pressed sheets from the strands was immersed in water at 100° C. for one day thereby to effect crosslinking of the copolymer. Hardness of each of the sheets was determined.

The results obtained are shown in Table 16.

EXAMPLES 34 AND 35

The procedure as set forth in Examples 26 through 31 was followed except that gypsum hemi-hydrate of an average particle size of 6 microns was used in place of kaolin clay. The gel content and the appearance of the strands obtained were determined.

The results obtained are shown in Table 17.

TABLE 14

| | Polymerization conditions | | | | | | Properties of copolymer | |
|---|---|---|---|---|---|---|---|---|
| Copolymer | Pressure Kg/cm² | Temperature °C. | Ethylene feed rate Kg/Hr | Vinylsilane feed rate g/Hr | Propylene feed rate lit./Hr | Initiator feed rate g/Hr | Conversion % | Melt*¹ index g/10 min. | Vinylsilane*² content % by wt. |
| A | 2400 | 220 | 43 | 25 | 550 | 1.7 | 15 | 1.0 | 0.10 |
| B | 2400 | 220 | 43 | 130 | 400 | 2.2 | 15 | 1.0 | 0.51 |

Note:
*¹, *² - See Notes *¹, *² for Table 1.

TABLE 15

| | | | Example | | | | | |
|---|---|---|---|---|---|---|---|---|
| | | | 26 | 27 | 28 | 29 | 30 | 31 |
| Composition (% by wt.) | Copolymer (a) based on | A | 89 | 69 | 40 | — | — | — |
| | | B | — | — | — | 89 | 69 | 40 |
| | (a) + (c) | Graft | — | — | — | — | — | — |
| | Cat. master batch based on (a) | | 5 | 5 | 5 | 5 | 5 | 5 |
| | Kaolin clay based on (a) + (c) | | 11 | 31 | 60 | 11 | 31 | 60 |
| Gel content*¹ just after extrustion, % by weight | | | 0 | 0 | 0 | 0 | 0 | 0 |
| Appearance of strand | | | good | good | good | good | good | good |
| Heat distortion*² % | | | 56 | 45 | 24 | 23 | 18 | 11 |

Note:
*¹, *²: See Note for Table 9.

TABLE 16

| | | | Example | |
|---|---|---|---|---|
| | | | 32 | 33 |
| Composition (% by wt.) | Copolymer (a) based on | A | 69 | — |
| | | B | — | 69 |
| | (a) + (c) | Graft | — | — |
| | Cat. master batch based on (a) | | 5 | 5 |
| | CaCO₃ based on (a) + (c) | | 31 | 31 |
| Gel content just after extrusion % by weight | | | 0 | 0 |
| Appearance of strand | | | good | good |
| Hardness (Shore D) | | | 54 | 57 |

TABLE 17

| | | | Example | |
|---|---|---|---|---|
| | | | 34 | 35 |
| Composition (% by wt.) | Copolymer (a) based on | A | 69 | — |
| | | B | — | 69 |
| | (a) + (c) | Graft | — | — |
| | Cat. master batch based on (a) | | 5 | 5 |
| | Gypsum hemi-hydrate based on (a) + (c) | | 31 | 31 |
| Gel content just after extrusion % by weight | | | 0 | 3 |
| Appearance of strand | | | good | fair |

What we claim is:

1. An expandable crosslinkable polyethylene resin composition comprising
    a copolymer formed by the copolymerization of ethylene and vinyltrimethoxysilane, wherein the content of vinyltrimethoxysilane in said copolymer is about 0.01 to 5 percent by weight and wherein said copolymer has been prepared by copolymerization under elevated pressure in the presence of a radical polymerization initiator,
    a silanol condensation catalyst and
    a foaming agent in the amount of 0.2 to 30 percent by weight based on the total weight of the copolymer and foaming agent, wherein said resin composition is capable of forming an expanded and crosslinked product having a gel content of about 23% to 78%.

2. A composition according to claim 1 in which the copolymer further comprises up to 40 percent by weight of a monomer copolymerized with the ethylene and vinyltrimethoxysilane, said percentage being based on the weight of the resulting copolymer.

3. A composition according to claim 1 or 2 further comprising a polyolefin in an amount of up to 70 percent by weight based on the sum of the quantities of the polyolefin and of the copolymer, the content of vinyltrimethoxysilane being based on the sum of the quantities of the polyolefin and of the copolymer.

4. A composition according to claim 1 or 2 further comprising an inorganic filler in an amount of up to 60 percent by weight based on the sum of the quantities of the copolymer and of the inorganic filler.

5. The composition according to claim 1 in which the content of said foaming agent is 0.5 to 20 percent by weight.

6. The composition according to claim 1 or 2 in which said copolymer has been prepared at a temperature of from 150° to 350° C. under a pressure of from 1,000 to 4,000 kg./cm.² in the presence of a radical polymerization initiator.

7. A method of producing an expanded crosslinked polyethylene resin composition having a gel content of about 23% to 78% comprising subjecting an expandable and crosslinkable resin composition to conditions under which a foaming agent contained in the resin composition is effective to expand the resin composition and into contact with water in the presence of a silanol condensation catalyst to crosslink said resin, wherein said expandable and crosslinkable resin composition is comprised of
    a thermoplastic copolymer formed by the copolymerization of ethylene and vinyltrimethoxysilane, wherein the content of vinyltrimethoxysilane in said copolymer is about 0.01 to 5 percent by weight,
    a silanol condensation catalyst and
    a foaming agent in the amount of 0.2 to 30 percent by weight based on the total weight of the copolymer and foaming agent.

8. The method according to claim 7 in which said copolymer further comprises up to 40 percent by weight of a monomer copolymerized with said ethylene and vinyltrimethoxysilane, said percentage being based on the resulting copolymer.

9. The method according to claim 7 in which said crosslinkable resin composition further comprises a polyolefin in an amount of up to 70 percent by weight based on the sum of the quantities of the polyolefin and of the copolymer, the content of vinyltrimethoxysilane being based on the sum of the quantities of the polyolefin and of the copolymer.

10. The method according to claim 7 in which said resin composition further comprises an inorganic filler in an amount of up to 60 percent by weight based on the sum of the quantities of the copolymer and of the inorganic filler.

11. The method according to claim 7 in which said copolymer has been prepared at a temperature of from 150° to 350° C. under a pressure of from 1,000 to 4,000 kg./cm.$^2$ in the presence of a radical polymerization initiator.

12. The expanded crosslinked polyethylene resin composition obtained by the method of any one of claims 7, 8, or 9.

13. The method to claim 7 or 8 wherein the content of vinyltrimethoxysilane in said copolymer is about 0.05 to 2 percent by weight.

14. The expandable composition according to claim 1 or 2 wherein the content of vinyltrimethoxysilane in said copolymer is about 0.05 to 2 percent by weight.

* * * * *